UNITED STATES PATENT OFFICE.

AUGUSTUS BISCHLER, OF ZURICH, SWITZERLAND, ASSIGNOR TO BASLE CHEMICAL WORKS BINDSCHEDLER, OF BASLE, SWITZERLAND.

METHOXY-ACETPHENETIDIN.

SPECIFICATION forming part of Letters Patent No. 563,009, dated June 30, 1896.

Application filed August 10, 1895. Serial No. 558,837. (Specimens.)

*To all whom it may concern:*

Be it known that I, AUGUSTUS BISCHLER, a subject of the Emperor of Russia, residing at Zurich, Switzerland, have invented new and useful Improvements in the Manufacture of Products for Use in Medicine and Pharmacy; and I do hereby declare the following to be a full, clear, and exact description of the invention, such as will enable others skilled in the art to which it appertains to make and use the same.

I have found that on heating the alkyloxy-fatty acids with primary and secondary aromatic amins, new products are formed. All of these products, which have been subject to clinical tests, have proved to be of excellent antipyretic, antineuralgic, and other valuable therapeutic effects.

There are obtained, for instance:

First, from methoxy-acetic acid and anilin the methoxy-acetanilid, according to the equation:

$$CH_3OCH_2COOH + NH_2C_6H_5 = CH_3OCH_2CONHC_6H_5 + H_2O.$$

Second, from ethoxy-acetic acid and anilin the ethoxy-acetanilid:

$$C_2H_5OCH_2COOH + NH_2C_6H_5 = C_2H_5OCH_2CONHC_6H_5 + H_2O.$$

Third, from methoxy-acetic acid and methylanilin the methoxy-acetmethylanilid:

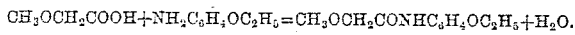

Fourth, from ethoxy-acetic acid and methylanilin the ethoxy-acetmethylanilid:

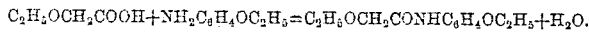

Fifth, from methoxy-acetic acid and paraphenetidin the methoxy-acetparaphonetidid:

$$CH_3OCH_2COOH + NH_2C_6H_4OC_2H_5 = CH_3OCH_2CONHC_6H_4OC_2H_5 + H_2O.$$

Sixth, from ethoxy-acetic acid and paraphenetidin the ethoxy-acetparaphenetidid:

$$C_2H_5OCH_2COOH + NH_2C_6H_4OC_2H_5 = C_2H_5OCH_2CONHC_6H_4OC_2H_5 + H_2O.$$

Instead of the alkyloxy-fatty acids the chlorids or the amids of the alkyloxy-fatty acids may be employed in these reactions.

To obtain the new products, one molecule of an aromatic amin is heated with little more than one molecule alkyloxy-acetic acid to 120° to 150° centigrade until no more water is separated. The product of reaction is then washed in water and recrystallized from a suitable solvent.

*Example:* One hundred kilos para-phenetidin are heated with seventy kilos methoxy-acetic acid during six hours to 130° to 140° centigrade. The product of reaction is washed in cold water and recrystallized from hot water. If necessary, the solution is bleached with animal charcoal.

The product, which has valuable antipyretic and antineuralgic properties, crystallizes in form of white needles with the melting-point of 100° to 102° centigrade.

The proper dose of my preparation for an adult is from 0.5 to one gram, taken once during the day, and as much as five grams may be administered to the patient in successive doses of 0.5 to one gram.

What I claim is—

As a new article of manufacture, the herein-described methoxy-acetphenetidin, which has the following characteristics, namely, it crystallizes in the form of white needles, melts at 102° centigrade, does not change color by the addition of acids or alkalies, is soluble in cold water and very easily soluble in alcohol and ether, and has the general formula $C_{11}H_{15}NO_3$.

In witness whereof I have hereunto signed my name in the presence of two subscribing witnesses.

AUGUSTUS BISCHLER.

Witnesses:
 GEORGE GIFFORD,
 AMAND RITTER.